(12) United States Patent
Shutty et al.

(10) Patent No.: US 8,978,600 B2
(45) Date of Patent: Mar. 17, 2015

(54) CONTROL METHODS FOR DUAL MODE COOLING PUMP

(75) Inventors: John Shutty, Clarkston, MI (US); Stephen Bohan, Potterville, MI (US); Joshua L. Roby, Battle Creek, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 13/473,577

(22) Filed: May 16, 2012

(65) Prior Publication Data

US 2013/0306005 A1    Nov. 21, 2013

Related U.S. Application Data

(63) Continuation-in-part of application No. 13/509,876, filed on Jan. 15, 2014.

(51) Int. Cl.
*F01P 5/12* (2006.01)
*F04D 1/00* (2006.01)

(52) U.S. Cl.
USPC ....... 123/41.47; 417/15; 417/410.1; 417/223; 307/9.1; 307/10.1; 180/65.31

(58) Field of Classification Search
USPC ........ 123/41.47; 417/15, 410.1, 223; 307/9.1, 307/10.1; 180/65.31
See application file for complete search history.

(56) References Cited

U.S. PATENT DOCUMENTS

| | | | |
|---|---|---|---|
| 5,415,134 A * | 5/1995 | Stewart, Jr. | 123/41.01 |
| 6,668,766 B1 * | 12/2003 | Liederman et al. | 123/41.44 |
| 6,863,140 B2 * | 3/2005 | Noreikat et al. | 180/65.23 |
| 7,119,454 B1 * | 10/2006 | Chiao | 307/9.1 |
| 7,494,439 B2 * | 2/2009 | Pashnik et al. | 475/159 |
| 7,953,533 B2 * | 5/2011 | Tsuda | 701/51 |
| 8,182,235 B2 * | 5/2012 | Morgan, Jr. | 417/16 |
| 8,196,553 B2 * | 6/2012 | Kline et al. | 123/41.11 |
| 8,342,418 B2 * | 1/2013 | Kanzaka et al. | 236/99 K |
| 2003/0200759 A1 * | 10/2003 | Iwanami et al. | 62/133 |
| 2005/0178635 A1 * | 8/2005 | Schultheiss et al. | 192/57 |
| 2008/0096711 A1 * | 4/2008 | Smith et al. | 475/5 |
| 2009/0205588 A1 * | 8/2009 | Bilezikjian et al. | 123/41.02 |
| 2011/0123365 A1 * | 5/2011 | Buchholz et al. | 417/319 |
| 2012/0269653 A1 * | 10/2012 | Lutoslawski et al. | 417/44.1 |

FOREIGN PATENT DOCUMENTS

DE  10214637 A1 * 10/2003 ............. H02K 11/00
WO  WO 2010142042 A1 * 12/2010 ............. B60R 17/00

OTHER PUBLICATIONS

Translation of Detailed Description for DE 10214637 A1, Engels et al., obtained from espacenet.com.*
Translation of Detailed Description for DE10214637A1; Engels et al.; publ'n date: Oct. 23, 2003; obtained from espacenet.com; pp. 1-7.*

* cited by examiner

*Primary Examiner* — Noah Kamen
*Assistant Examiner* — Grant Moubry

(57) ABSTRACT

Methods and systems for controlling the operation of a dual mode engine accessory, such as a dual mode cooling pump. The dual mode device has two modes of operation, an electric motor operation and a mechanical pulley-driven operation. A friction clutch mechanism controlled by the control system is utilized to switch between the two modes of operation. The speed of the electrical motor can be changed to be substantially the same as, or changed in the direction of, the speed of the mechanical pulley-driven system.

14 Claims, 10 Drawing Sheets

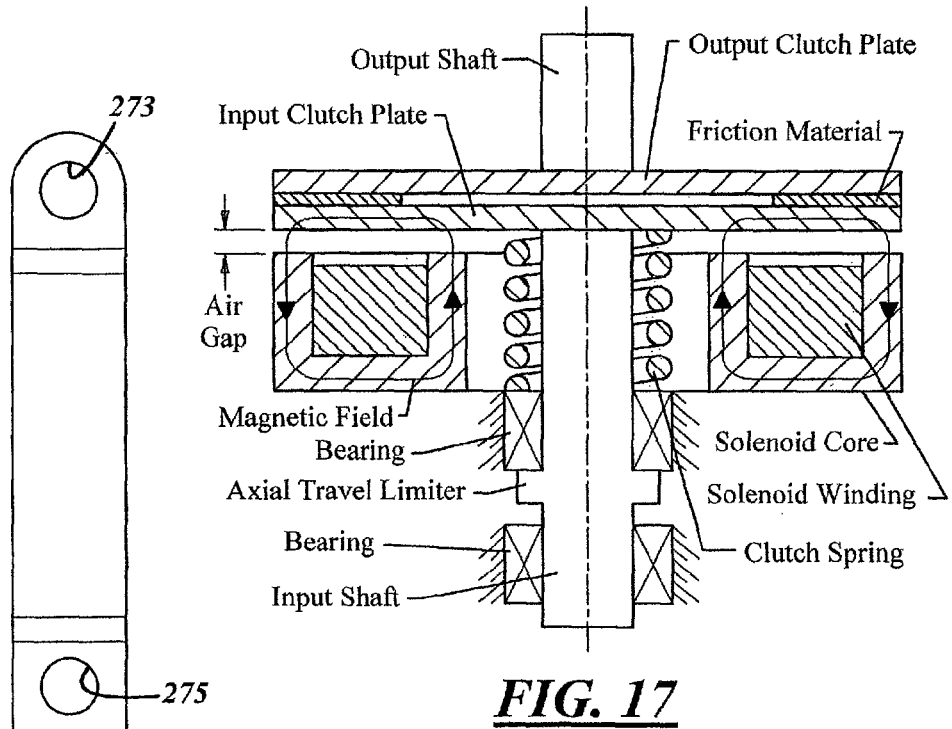
FIG. 17
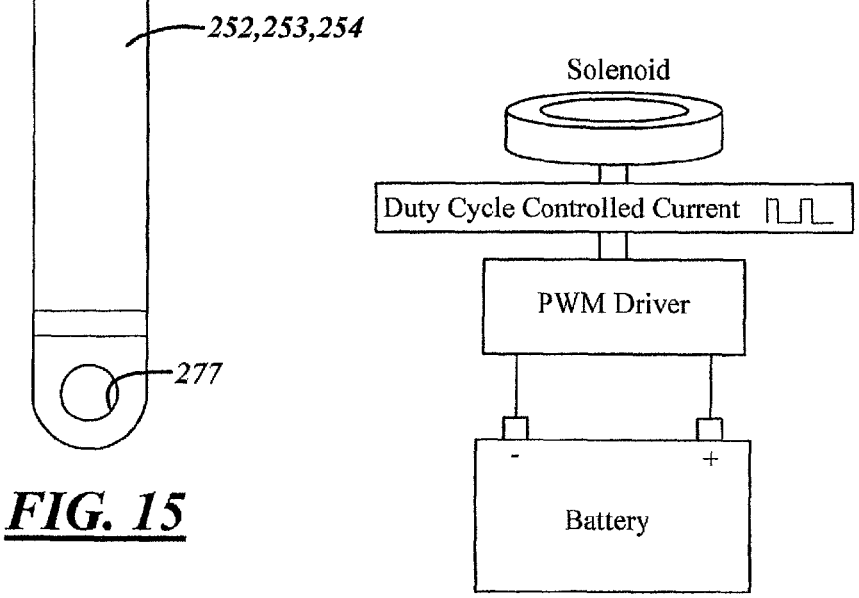
FIG. 15
FIG. 18

CONTROL METHODS FOR DUAL MODE COOLING PUMP

CROSS-REFERENCE TO RELATED APPLICATIONS

This application is a continuation-in-part of U.S. application Ser. No. 13/509,876 filed Jan. 15, 2014. This application also claims priority to U.S. Patent Application Ser. No. 61/474,895, filed on Apr. 13, 2011, and entitled "Control System For Friction Clutch Assembly," subsequently filed on Apr. 11, 2012, as International Application No. PCT/US12/32974. This application is also related to U.S. Patent Application Ser. No. 61/474,862, filed Apr. 13, 2011, entitled Hybrid Coolant Pump, subsequently filed on Apr. 10, 2012, as International Application No. PCT/US12/32849, U.S. Patent Application Ser. No. 61/474,876, filed on Apr. 13, 2011, entitled Pulley Assembly For A Vehicle Accessory, subsequently filed on Apr. 10, 2012, as International Application No. PCT/US12/32856, U.S. patent application Ser. No. 61/474,928, filed on Apr. 13, 2011, entitled Friction Clutch Assembly, subsequently filed on Apr. 10, 2012, as International Application No. PCT/US12/32863, and U.S. patent application Ser. No. 61/474,907, filed Apr. 13, 2011, entitled Compression Spring Member, subsequently filed on Apr. 10, 2012, as International Application PCT/US12/32876.

TECHNICAL FIELD

This invention relates to control system for engine accessories and more particularly to control methods and systems for dual mode cooling pumps and other accessories.

BACKGROUND

Water pumps are used in water cooled engines, primarily for operation of vehicles such as automobiles and trucks with internal combustion engines. The water pumps are typically driven by a belt attached to the crankshaft of the engine and thus operate at some percentage of engine speed. The pumps have an impeller that is used to circulate the engine coolant from the engine to the radiator and back in order to keep the coolant within acceptable temperature limits.

Efforts are being made today to reduce the power consumption of engine accessories, such as water pumps, in order to improve fuel economy and reduce emissions. It would thus be preferable if such accessories, including water pumps, could be made to operate at variable speeds or with less power in order to reduce the load on the engine and, in turn, improve fuel economy and reduce undesirable emissions from the engine.

SUMMARY OF THE INVENTION

An improved water pump is disclosed. The water pump has two modes of operation, a first mode driven mechanical, by the engine accessory belt, and a second mode operated by an electric motor, such as a brushless DC (BLDC) motor.

The components for the two modes of operation are contained within a housing that includes the pulley member as part of the housing. A shaft connected to the impeller of the water pump is positioned in the housing and is controlled by one mode of operation or the other, depending on certain factors.

The housing rotates at input speed driven by the engine accessory belt which is positioned on the pulley member. A friction clutch is provided inside the housing to selectively drive the water pump mechanically by the pulley member. A solenoid is utilized to control operation of the friction clutch.

The water pump is normally driven by the electric motor throughout most of its range of operation. When peak cooling is needed, the mechanical operation mode takes over and the water pump is driven directly by the pulley member. The friction clutch includes a softening spring member which minimizes the electrical power consumed by the clutch. The hybrid cooling pump has a variable speed control which results in the use of less power, the improvement of fuel economy, and the reduction of emissions.

The pulley assembly consists of two pieces, namely a pulley member and a clutch housing member. This configuration provides for distribution of the belt load between separate bearings minimizing overhung bearing loads.

A preferred control system provides for a "softer" engagement from one of the dual methods of operation to the other. The speed of the electric motor and the speed of the engine are brought closer together prior to switching from one driving mode to the other. This reduces slip and improves durability of the accessory, preferably relative to the friction members and frictional engagement.

The amount of electrical power supplied to the dual mode component during clutch engagement can be regulated such that the speed of the shaft rotating in the dual mode component is similar to or the same as the speed that the shaft would be rotating if only mechanical power at the engine speed is supplied. Thereafter, the electrical power can be reduced in a step or ramp fashion until the component is only being driven by mechanical power. The speed of the electrical power operation can be increased or reduced in order to be substantially the same as, or close to, the speed of the mechanical power operation. The closer the speeds are to being the same, the better will be the transition from one mode to the other, and the longer the life will be of the friction member on the friction clutch mechanism.

Another embodiment includes a method wherein the system includes a battery and wherein supplying electrical power comprises delivering electrical power from the battery. A capacitor could be utilized also to provide an energy storage device. Another embodiment includes a method comprising recovering energy from a first vehicle component, converting the energy to electrical power, storing the electrical power in a battery, and supplying electrical power from the battery to the dual mode component constructed and arranged to drive a second vehicle component using mechanical power and electrical power.

Another embodiment includes a method comprising recovering thermal energy from a vehicle component, converting thermal energy to electrical power, storing the electrical power in a battery, and supplying electrical power from the battery to the dual mode component constructed and arranged to drive a second vehicle component using mechanical power and electrical power. Another method comprises determining when an engine of the vehicle system is accelerating at first rate or greater than the first rate, and if so, then supplying electrical power to a dual mode component while the dual mode component is also being driven by mechanical power. The additional power to accomplish this could be supplied by a battery or capacitor.

Another embodiment includes a method of operating a vehicle system, the vehicle system including a battery and a dual mode component connect to the battery, measuring the remaining capacity of the battery to store additional energy, and if the remaining capacity is at or less than a first amount or capacity, then supplying electrical energy from the battery to the dual mode component to drive the dual mode component and to utilize a portion of the energy that was stored in the battery thereby freeing up capacity in the battery to store energy from mechanical and thermal energy recovery components.

Another embodiment includes a method wherein the dual mode component is being driven also by mechanical energy during the supplying electrical energy from the battery to the dual mode component to drive the dual mode component and to utilize a portion of the energy that was stored in the battery.

Another embodiment includes a method where the vehicle braking system is utilized to supply power back to the battery and thus to assist in operating the electric mode of the dual motor cooling pump or other accessory.

Also disclosed are various embodiments of products and computer program products to implement one or more of the method embodiments above.

Further objects, features and benefits of the invention are set forth below in the following description of the invention when viewed in combination with the drawings and claims.

BRIEF DESCRIPTION OF THE DRAWINGS

FIG. 14 schematically depicts another embodiment of a compression spring mechanism which can be used with the present invention.

FIGS. 15 AND 16 illustrate a planar and side view, respectively, of one of the buckling beam members utilized with the embodiment shown in FIG. 14.

FIG. 17 schematically illustrates an electromagnetic clutch mechanism.

FIG. 18 schematically illustrates a solenoid control system.

DESCRIPTION OF THE PREFERRED EMBODIMENTS

Figure 1:
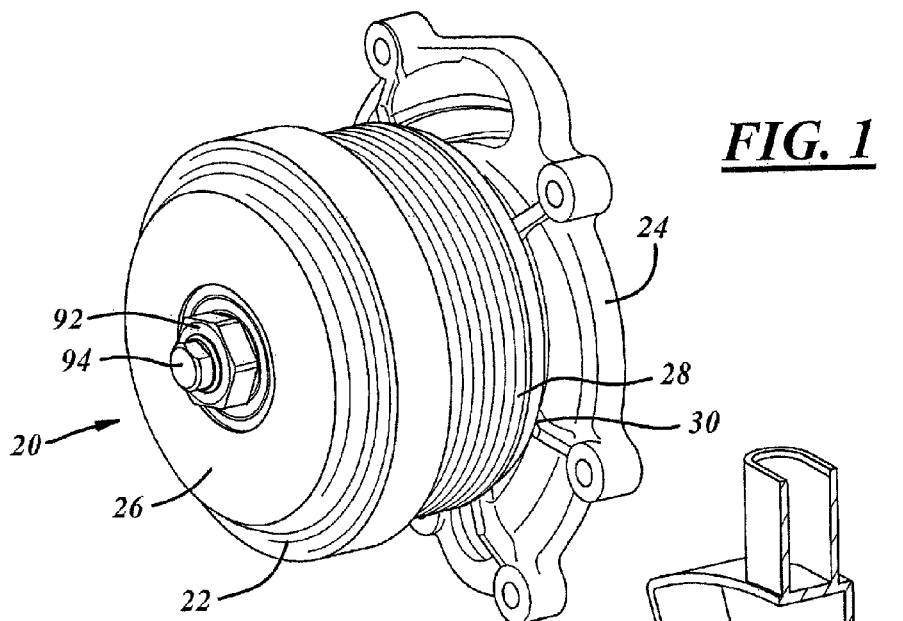
FIG. 1 illustrates a water pump in accordance with one embodiment of the invention.

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated devices and described methods and further applications of the principles of the invention which would normally occur to persons of ordinary skill in the art to which the invention relates.

The present inventions described herein particularly relate to hybrid coolant pumps which are used to circulate the coolant in an engine, such as an automobile internal combustion engine. However, the present invention can also be used for other engine accessory devices, such as air conditioning compressors, engine oil pumps and transmission oil pumps, etc. Also, several components, mechanisms and systems described herein, including, but not limited to, the compression spring, the solenoid actuated friction clutch and/or the PWM control system, can have significant uses in other devices and systems.

As a coolant pump, the pump is electrically driven under most conditions. However, it also can be mechanically engaged where more cooling is required. Thus, when the vehicle is being driven under most normal conditions, the water pump is being driven and operated by the electric motor.

During "worst case" cooling conditions, such as when the vehicle is heavily loaded, when it is pulling a trailer, when it is going up hill in the summertime, etc., the water pump is adapted to be mechanically driven by the belt directly from the engine. This provides the necessary cooling under such circumstances.

In accordance with a preferred embodiment of the invention, the electric motor is a brushless DC (BLDC) motor and the motor is positioned inside a pulley assembly. The pump is also adapted to be driven mechanically when needed by the engine belt, such as a serpentine belt, attached to the crankshaft of the engine.

The preferred embodiment of the present invention as described herein is particularly adapted for use with trucks, passenger cars and off-highway vehicles. Since the preferred embodiment also provides variable speed control of the water pump, it uses less power from the engine and thus improves fuel economy and reduces emissions.

A hybrid water pump embodiment in accordance with the present invention is shown in FIG. 1 and referred to generally by the reference numeral 20. The hybrid water pump includes a pulley assembly 22 and a water pump housing 24. The pulley assembly 22 has a clutch housing member 26 and a pulley member 28. The pulley member 28 has circumferential grooves 30 for being driven by a belt (not shown).

Figure 2:
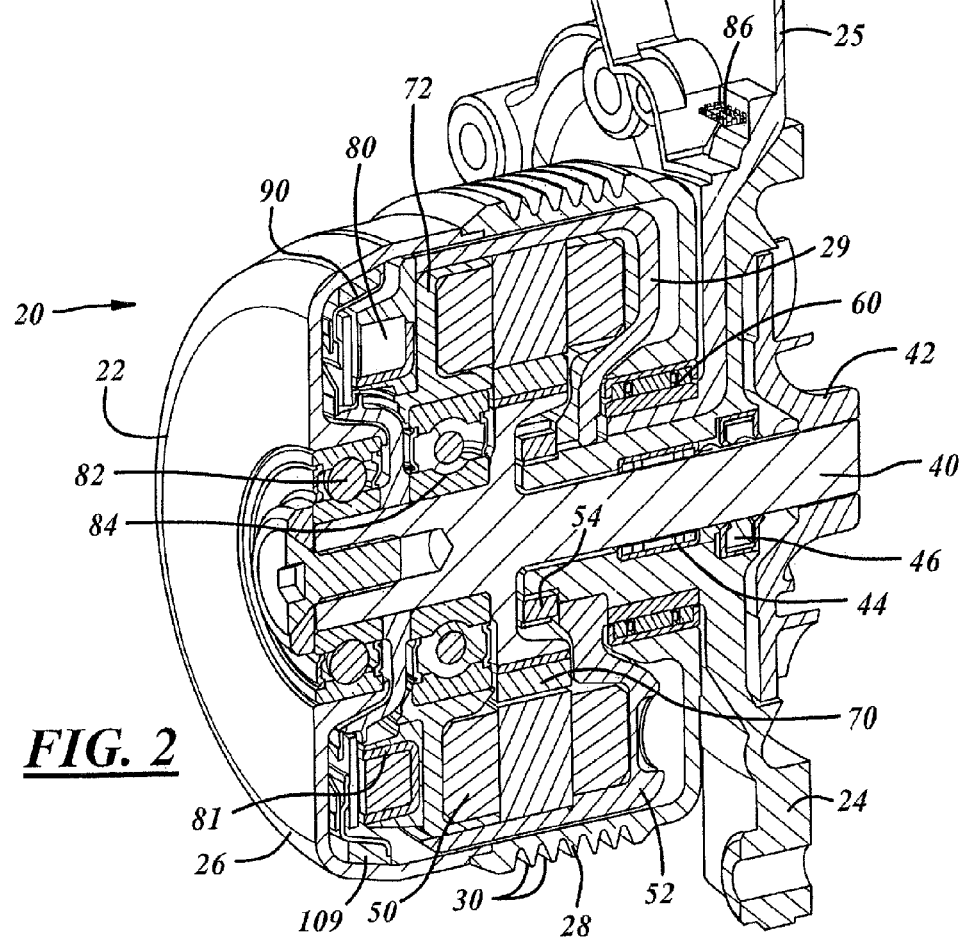
FIG. 2 is a cross-sectional view of the water pump shown in FIG. 1.
Figure 3:
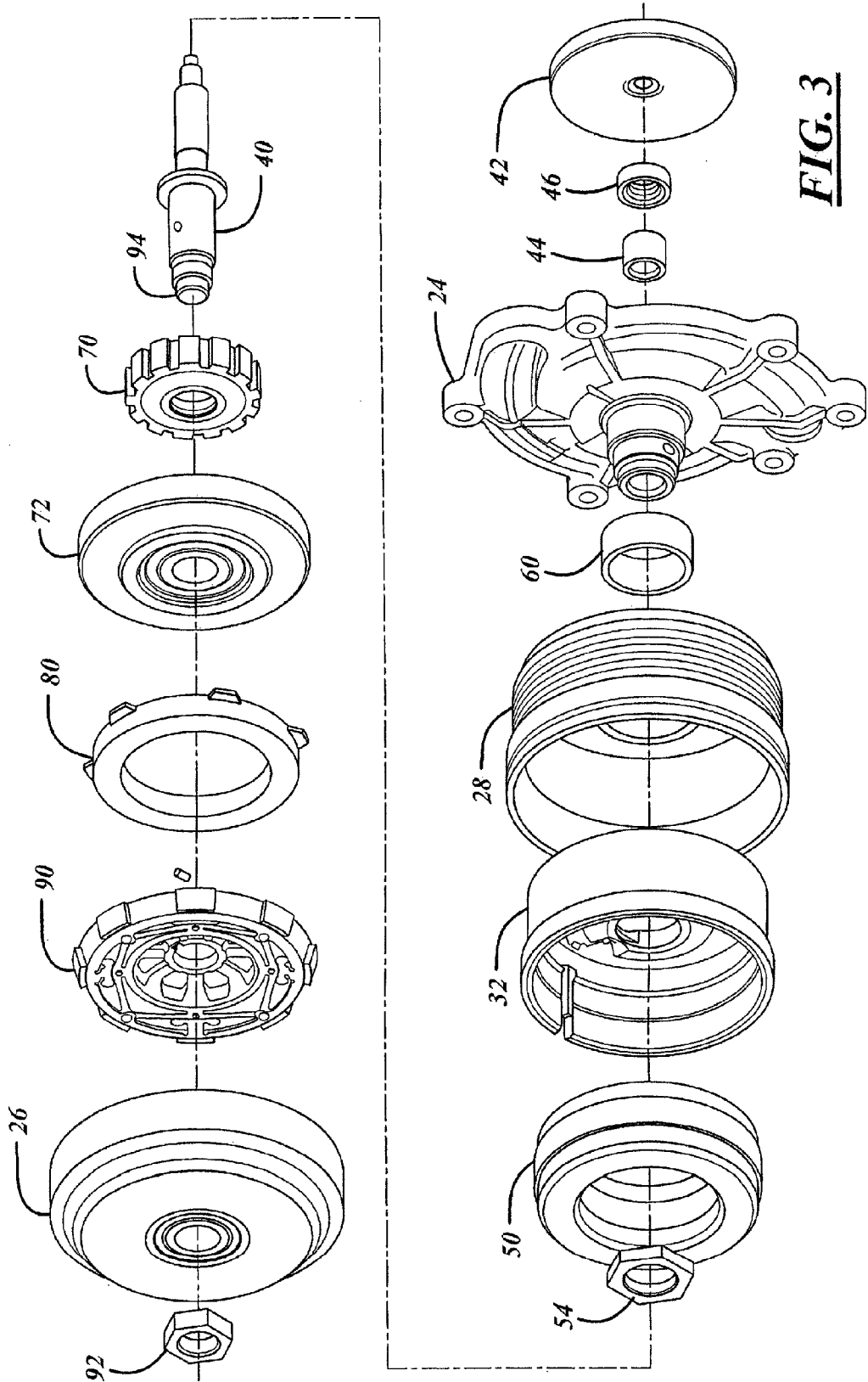
FIG. 3 is an exploded view of the components of the water pump as shown in FIGS. 1 and 2.

A cross-sectional view of the water pump 20 is shown in FIG. 2 and an exploded view of the components of the water pump 20 is shown in FIG. 3.

The water pump has an impeller shaft 40 which is positioned within the pulley assembly 22 and also is attached to a water pump impeller 42. The impeller shaft 40 is held in place in the pump housing 24 by needle bearing 44 and middle bearing 84. A coolant seal 46 is used to prevent coolant in the pump from leaking into the pulley assembly.

A motor stator 50 is positioned inside a stator housing 52 in the pulley assembly 22. A nut, such as a spanner nut 54, is used to hold the stator housing 52 to the pump housing 24.

A second needle bearing 60 is positioned between the pulley member 28 and the pump housing 24 in order to allow the pulley assembly 22 to rotate freely relative to the pump housing.

A motor rotor 70 is positioned inside a front bearing carrier 72, which preferably is made from an aluminum material. The motor is preferably a brushless DC (BLDC) electric motor. A solenoid member 80 is positioned immediately adjacent the front bearing carrier 72. A friction clutch assembly 90 is positioned adjacent the front cover of the motor housing 22 and operated by the solenoid member 80. Bearing member 84 is positioned between the bearing carrier 72 and the impeller shaft 40.

A fastening member such as a hex nut 92 secures the pulley assembly 22 to the impeller shaft 40 via the front bearing 82. As indicated particularly in FIGS. 2 and 3, the pulley assembly 22 consists of two pieces, namely a pulley member 28 and clutch housing 26. This configuration provides for distribution of the belt load between the rear needle bearing 60 and the front ball bearing 82, thereby eliminating overhung bearing loads. Consequently, the bearing loads are minimized resulting in a more durable and long-lasting product.

As indicated, the water pump is normally driven by the electric motor. The electric motor is electrically powered through a circuit board (not shown) connected to pin-type contact members 86. Electrical leads and wires can be insert molded in housing 25 and lead frame 29 in order to carry the electrical signals to the electric motor stator 50 and solenoid 80. The circuit board further communicates with the electronic control unit (ECU) of the vehicle through the vehicle communication network such as a CAN network. The pump controller circuit board could also be positioned inside the pulley assembly 22 rearward of the stator housing 52 and having a donut shape.

The speed of the motor and thus the water pump is selected according to the cooling required for the engine. Sensors feed relevant data to the ECU which then sends a signal to the pump controller requesting the desired speed. The pump controller then determines whether the desired speed is best achieved using the electric motor or by engaging the friction clutch and driving the impeller directly from the pulley.

Figure 13:
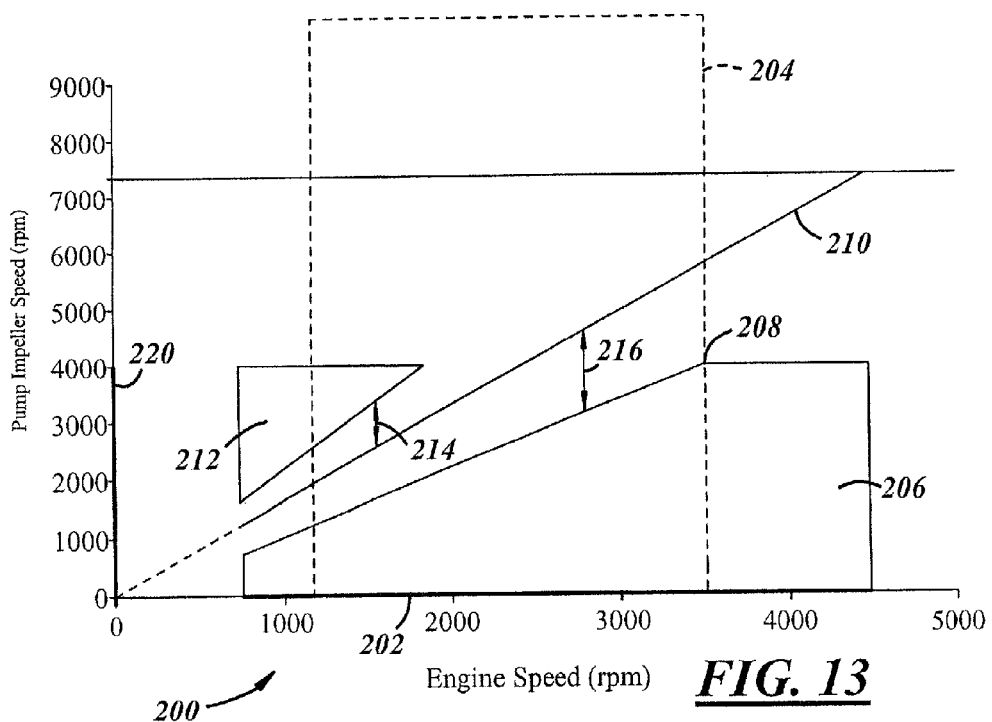
FIG. 13 schematically illustrates the operating modes of a preferred embodiment of the present invention.

FIG. 13 is a graph 200 schematically illustrating the functional modes of the hybrid pump. The speed of the engine is shown along the X-axis and the speed of the impeller is shown along the Y-axis in FIG. 13. Both speeds are shown in revolutions per minute (RPM).

The principal electric drive mode of the hybrid pump drive is shown at 206. Peak torque is achieved by electric motor 208. Full pulley drive (a/k/a "belt drive") is shown by line 210. Here the pump is being driven mechanically by the engine through the accessory belt. The slope of line 210 may be changed by modifying the pulley ratio between the engine crank pulley and the pump pulley member 28.

An optional electrical drive area is shown at 212. This area represents the region in which the electric motor is able to provide an "over-drive" feature where the pump can be spun at speeds greater than the mechanical input speed. The regions 214 and 216 are due to the efficiency loss in the electric drive mode from converting mechanical energy to electrical energy in the alternator and then back to mechanical energy in the electric motor. Although the pump could be operated electrically in regions 214 and 216, it is more energy efficient for the pump to jump to the mechanical drive mode 210. In 202, the pump is OFF and the impeller is not rotating. In this embodiment, the pump is OFF regardless of the speed of the engine. It is also possible to drive the pump electrically when the engine is turned off. This is shown at 220.

Figure 4:
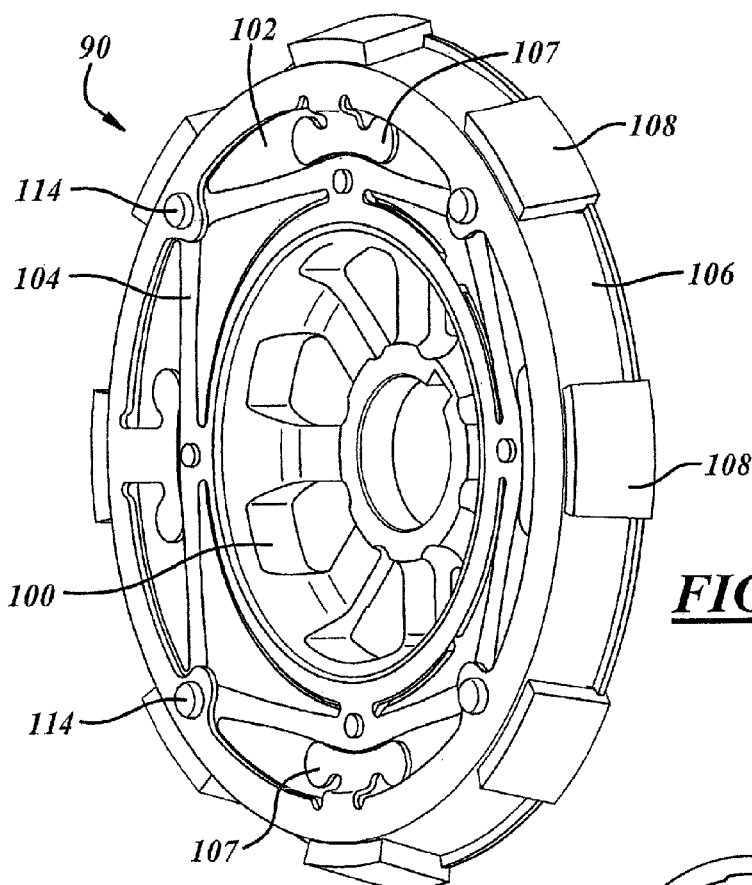
FIG. 4 illustrates a friction clutch embodiment which can be used in accordance with the present invention.
Figure 5:
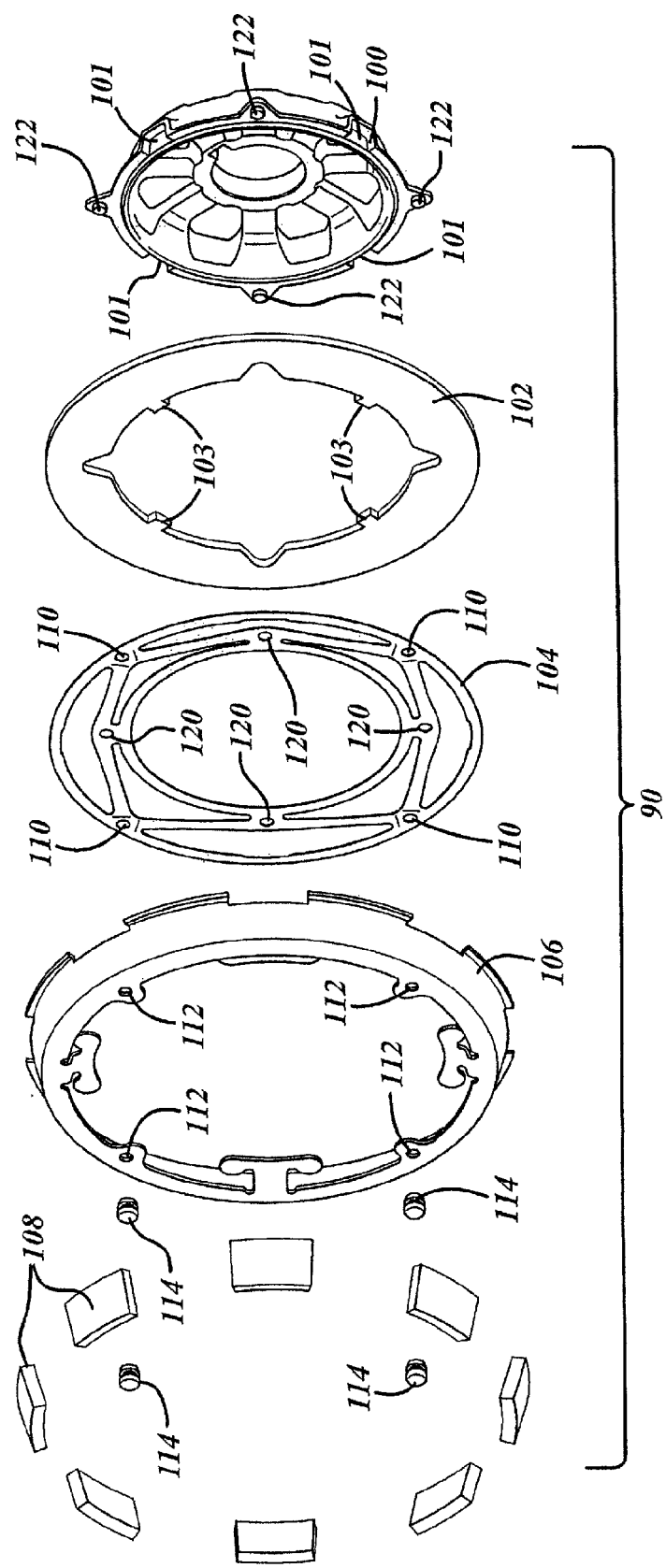
FIG. 5 is an exploded view of the friction clutch as shown in FIG. 4.

An enlarged view of the friction clutch 90 is shown in FIG. 4, while an exploded view of the components of the friction clutch 90 is shown in FIG. 5. The friction clutch 90 includes a clutch carrier member 100, a flux plate member 102, a compression spring member 104, and a friction lining carrier member 106. Pieces of friction lining material 108 are attached to its outer circumference of the carrier 106, as shown in FIG. 4. The friction lining members 108 can be of any conventional friction material and can be of any size and shape. Although the friction lining material is shown with a plurality of separate members, as shown in FIGS. 4 and 5, the friction lining can be a single piece or any number of separate members positioned around the circumference of the friction lining carrier member 106.

The friction lining material will wear over time as the hybrid pump is utilized. As this takes place, the capacity of the friction clutch 90 will increase due to the design of the compression spring member 104 which develops more force as the lining material wears.

Figure 6:
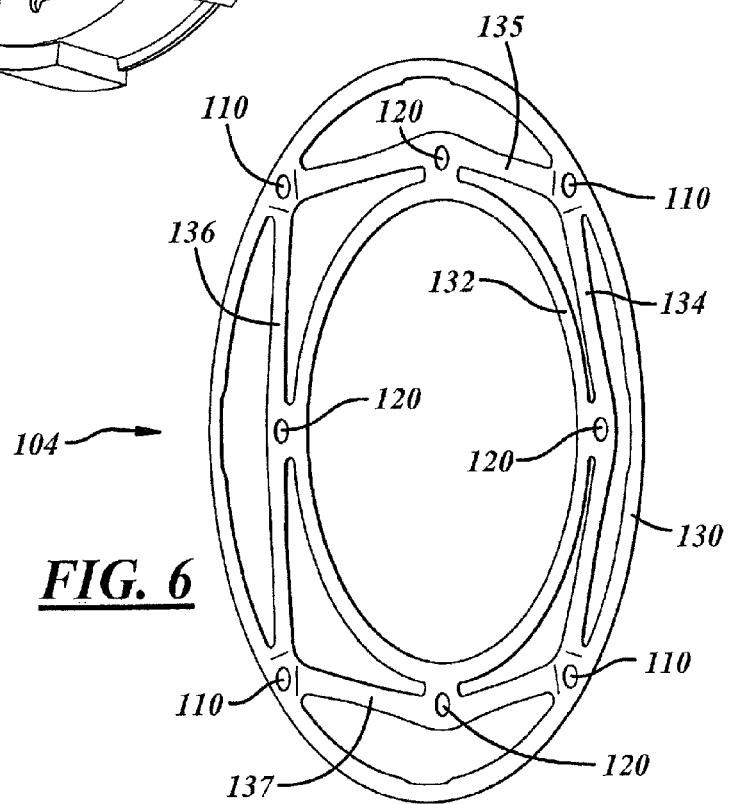
FIG. 6 is an embodiment of a compression spring which can be used with the present invention.

An enlarged view of one embodiment of a compression spring member 104 is shown in FIG. 6. The spring member 104 is a "softening" spring member since the force necessary to compress it decreases over time once it reaches a certain peak.

The spring member 104 has a plurality of holes or openings in order to be attached to the friction lining carrier member and the clutch carrier member. In this regard, a series of four holes 110 are provided on the compression spring member 104 in order to mate with openings 112 in the friction lining carrier member 106. A plurality of rivets 114 or the like are used to secure the compression spring member 104 to the friction lining carrier member 106. The compression spring member can be joined to the friction lining carrier member by any conventional method, such as by welding, brazing, threaded fasteners, etc.

The second series of openings in the compression spring member include four openings 120. These openings mate with corresponding post members 122 on the clutch carrier member 100. The post members 122 are deformed or swaged over when the friction clutch assembly 90 is assembled in order to securely hold the components of the friction clutch assembly together.

When the friction clutch assembly 90 is in the engaged position, torque is transferred from the pulley assembly 22 through the friction lining members 108 to the friction lining carrier 106. The friction lining carrier then transfers torque through the compression spring member 104 to the clutch carrier member 100 which turns the impeller shaft.

Figure 8:
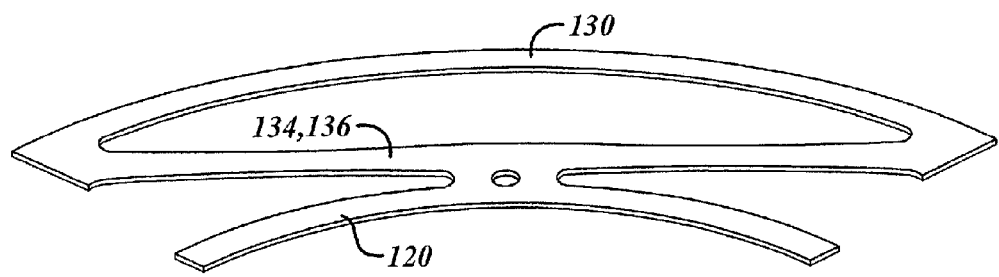
FIG. 8 is an enlarged view of a portion of the compression spring member in the uncompressed condition.
Figure 9:
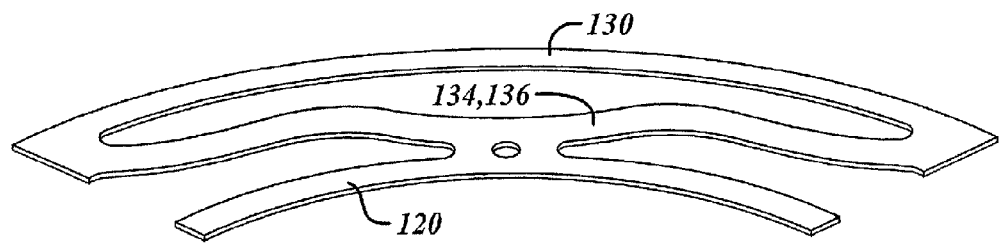
FIG. 9 is an enlarged view of a portion of the compression spring member in the compressed condition.

The compression spring member embodiment 104 has an outer ring member 130 and an inner ring member 132. The two ring members 130 and 132 are connected together by a plurality of connecting members 134, 135, 136 and 137. Enlarged portions of the compression spring member 90 are shown in FIGS. 8 and 9. When the spring member 104 is assembled in the friction clutch assembly 90, the outer and inner ring members 130 and 132, respectively, are held securely in place and are fixed so they cannot be moved radially toward or away from each other during operation of the friction clutch assembly.

Figure 7:
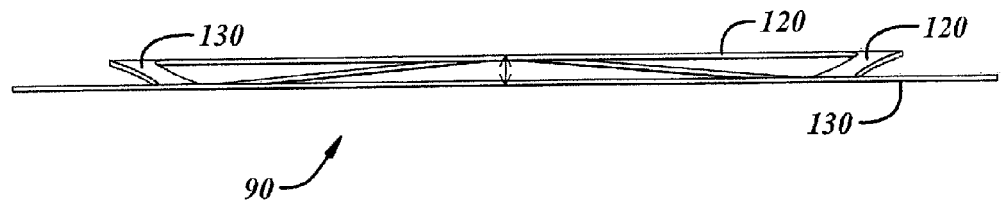
FIG. 7 is a side view of the compression spring member as shown in FIG. 6.

In FIG. 8, the compression spring member is shown in the uncompressed position. This is also shown in FIGS. 6 and 7.

Figure 10:
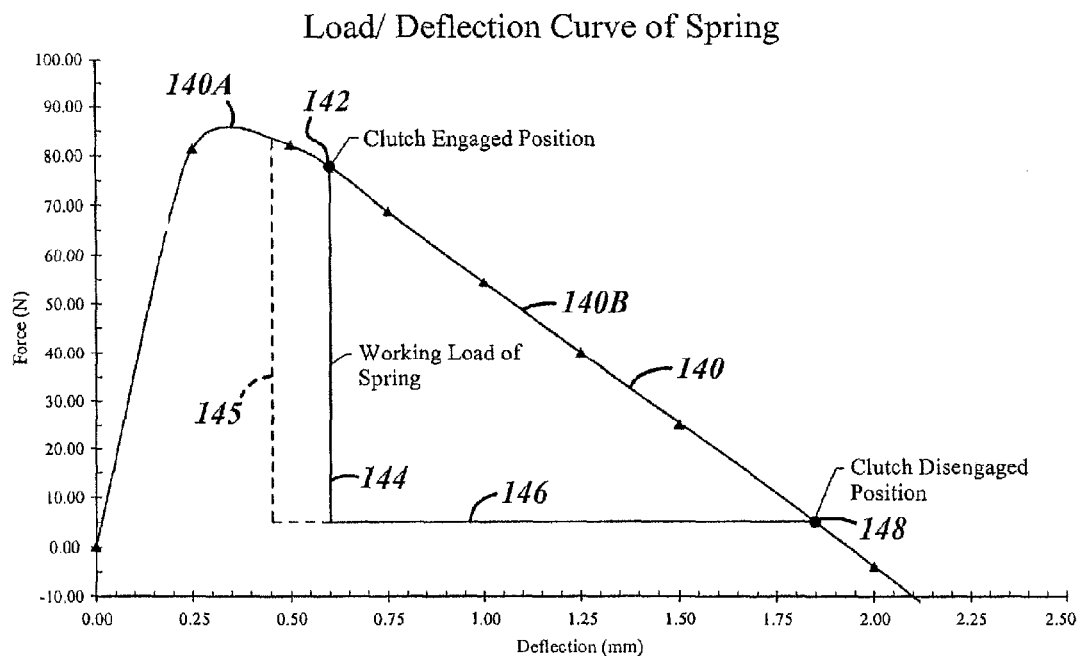
FIG. 10 is a load-deflection curve of an embodiment of a compression spring member for use with the present invention.

When the spring member 90 is compressed to the position 142 shown in FIG. 10, the spring member forces the friction lining carrier member 106 and friction lining members 108 against the conical friction surface 109 (FIG. 2) inside of the clutch housing member 26 causing mechanical operation of the water pump. The clutch housing member 26 can be aluminum and the conical friction surface can be thermal spray coated with a variety of materials such as low carbon steel.

When the friction clutch assembly 90 is energized by the solenoid 80, the flux plate 102 is attracted to the solenoid assembly due to the force developed in the air gap between the solenoid core 81 and the flux plate. As the flux plate 102 moves toward the solenoid, the compression spring member 104 is compressed separating the friction lining carrier member 106 and friction members from their engaged positions against the inside surface of the clutch housing member 26. In the compressed condition, the connecting members 134, 135, 136 and 137 are buckled and distorted such as in the manner schematically depicted in FIG. 9. In this position, the water pump is operated only by the electric motor.

The flux plate 102 is securely attached to the friction lining carrier 106 through tabs 107 (FIG. 4). The attachment of the flux plate and friction lining carrier may be through any conventional joining technique such as spot welding, screws, rivets, or the like.

Axial travel of the clutch assembly is limited by the engagement of tabs 103 on the flux plate 102 within pockets 101 on the clutch carrier member 100 (FIG. 5). This axial travel limit prevents the pole plate from coming into contact with the solenoid core member 81 as the pole plate rotates with impeller speed and the solenoid core is stationary.

The load/deflection curve of the compression spring member 104 in accordance with a preferred embodiment is shown in FIG. 10. As shown in FIG. 10, the load/deflection curve 140 reaches quickly to a maximum amount of force 140A and then needs less force in order to continue to deflect the spring member after it is starting to buckle and deform. This is shown by the second part of the curve 140B. This means that once the compression spring has reached point 140A, less force is needed to further deflect the spring and thus prevent the friction clutch assembly from contacting the inside of the housing. In this regard, the clutch engaged position is shown at point 142, the working load of the spring is indicated by line 144, the working length of the spring is shown by line 146, and the clutch disengaged position is shown at point 148. Thus, once the maximum amount of force necessary to buckle or deform the spring is reached, increasingly less force is necessary in order to deflect the spring further and thus allow complete operation of the water pump by the electric motor. The softening spring member thus enables the parasitic electric power consumption of the clutch disengagement solenoid 80 to be minimized. This is accomplished by pulse width modulating ("PWM") the current supplied to the solenoid. To disengage the solenoid the solenoid drive controller operates the solenoid drive Field Effect Transistor ("FET") at 100% PWM so full current is supplied to the solenoid. The controller has a current sensing technology such that when the clutch seats in the fully disengaged position it is able to sense the current change indicating the clutch is disengaged. At this point, the controller drops the PWM to a smaller level such as 10%, so less current is consumed by the solenoid. Since the compression spring 104 develops much less force in this position 148 as shown in FIG. 10 and the magnetic circuit is much more efficient as the air gap is smaller, the lower current level is still adequate to keep the clutch in the disengaged position.

It is quite common in automotive accessories such as air conditioning compressors, pumps, etc. to use spring engaged, electromagnetically disengaged clutches to selectively turn on and off the drive to the accessory component. This is typically done to conserve energy when the device is not needed. These devices are typically designed to be spring engaged so the accessory device is powered in the event of a control failure such as a loss of electrical power. This is done to provide "Fail-Safe" functionality meaning that the device defaults to its "on" state when it is unpowered.

The primary disadvantage of these "Fail-Safe" clutch designs is that they require continuous electrical power to keep the device disengaged when it is not needed. For many accessory devices this condition can constitute a large percentage of their operating life. Furthermore, these devices often require 20+ watts of electrical power, which can be a significant portion of the alternator output. On modern vehicles which employ a large number of electrical components (seat heaters, window defrosters, electric seats, and a host of other devices), it is not uncommon to exceed the maximum power capacity of the alternator.

A preferred embodiment of the present invention provides a means of mitigating this problem by minimizing the parasitic power consumed by electromagnetically disengaged clutches. Fundamentally this arrangement takes advantage of the physical relationship between the force developed in the air gap of a magnetic circuit and the length of the air gap. This relationship is described by the following Equation where $m_1$ and $m_2$ are the respective field strengths of the two poles of the magnetic circuit, $\mu$ is the permeability of the free space and r is the distance between the poles.

$$F = \frac{\mu_0 m_1 m_2}{4\pi r^2}$$

From the equation it is evident that the field strength falls off with the square of the distance between the magnet poles. Furthermore, it evident from FIG. 17 that the spring force used to engage the clutch will increase linearly when the solenoid is energized and the air gap closes. This means that the solenoid will have excess capacity in its closed position since the magnetic field strength increases with the square of distance and the counteracting spring force only increases linearly with distance. Since the field strength of the magnetic poles are related to the current flowing through the coil and the number of coil turns, it is evident that less current is required to hold the clutch in the disengaged position than what is required to pull the clutch out of engagement. Furthermore, if the clutch engagement spring is designed in such a way that the spring softens as it is compressed as described herein, this effect will be even further pronounced.

To capitalize on this condition, the present invention employs a PWM (Pulse Width Modulation) control system for the solenoid as shown in FIG. 18. The PWM control system uses a PWM Driver (typically a Field Effect Transistor and supporting circuitry) to pulse the solenoid power on and off at a very high speed, typically on the order of a few hundred hertz. Since the solenoid provides a relatively large inductance which prevents the current from changing instantaneously, this has the effect of reducing the average current delivered to the solenoid. The average current level can then be controlled by varying the duty cycle of the PWM Driver.

With this methodology, the PWM Driver is used to apply 100% duty cycle or full current to the solenoid to generate the maximum force in the air gap to pull the clutch out of engagement. Once the clutch is in the disengaged position, the duty cycle can be reduced to a much lower level, effectively reducing the average current supplied to the solenoid and consequently reducing the power consumption.

The PWM Driver can furthermore incorporate current sensing technology in such a way that a microcontroller is able to monitor the current supplied to the solenoid. This is advantageous in that a current spike will be evident on the solenoid supply line when the moving pole of the solenoid seats against the travel limit. This current spike can be used as a signal to the microprocessor that the clutch is in its retracted position and the duty cycle can be reduced.

Figure 19:
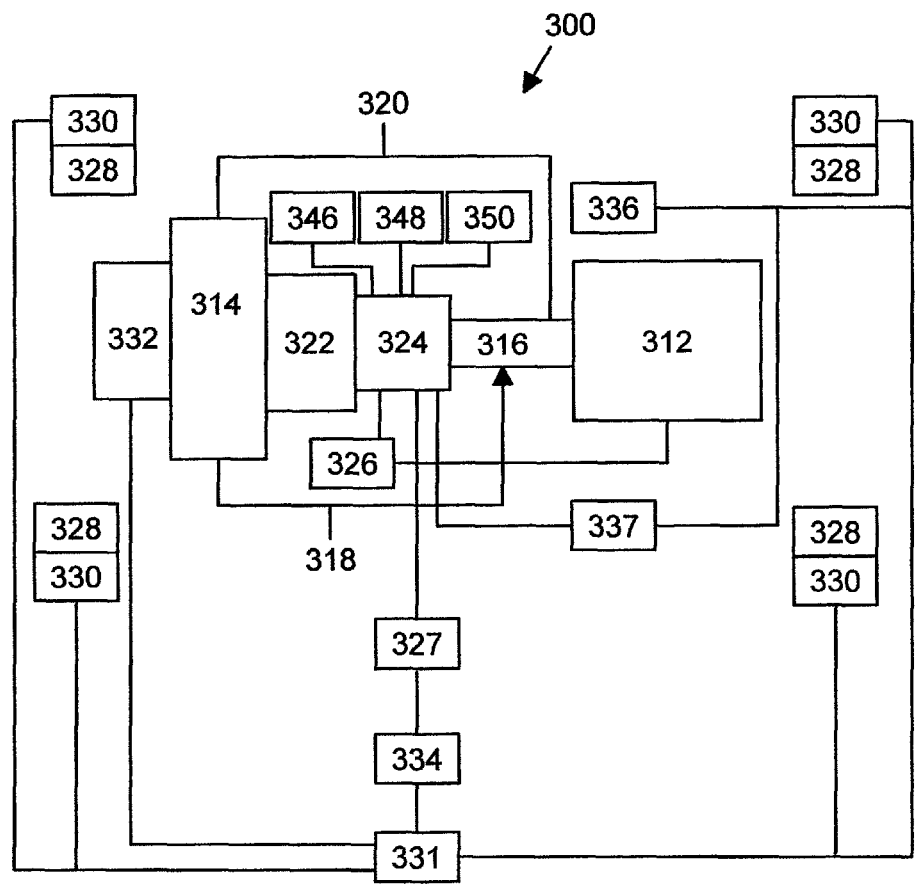
FIG. 19 is a schematic illustration of a vehicle system according to another embodiment.

FIG. 19 is a schematic illustration of a vehicle system 300 according to one embodiment. The vehicle system may include a combustion engine 312, a radiator 314, and a coolant pump 316 connected to the combustion engine 312 and constructed and arranged to flow coolant through coolant passages defined in the engine. Plumbing 318 is provided from the radiator to the coolant pump 316 and plumbing 320 is provided from the coolant pump 316 back to the radiator 314. A fan 322 may be provided and positioned to force air over the radiator 314 including radiator fins to remove heat from the radiator and coolant flowing through the radiator 314. A dual mode component 324 is provided and is constructed and arranged to be driven or powered by both mechanical power and electrical power. The dual mode component 324 in FIGS. 19 and 20 may be connected to at least one of the coolant pump 316 or the fan 322 to operatively drive the same. In one embodiment, the coolant pump 316 and the dual mode component 324 are contained in a common housing.

Preferably, the dual mode component is the dual mode cooling pump 20 as described above and has the same structure, benefits and features as described above (FIGS. 1-18). In accordance with the embodiments as set forth in FIGS. 19 and 20, the dual mode component 324 can be connected to either a coolant pump or a cooling fan and operational to drive either one.

Figure 20:
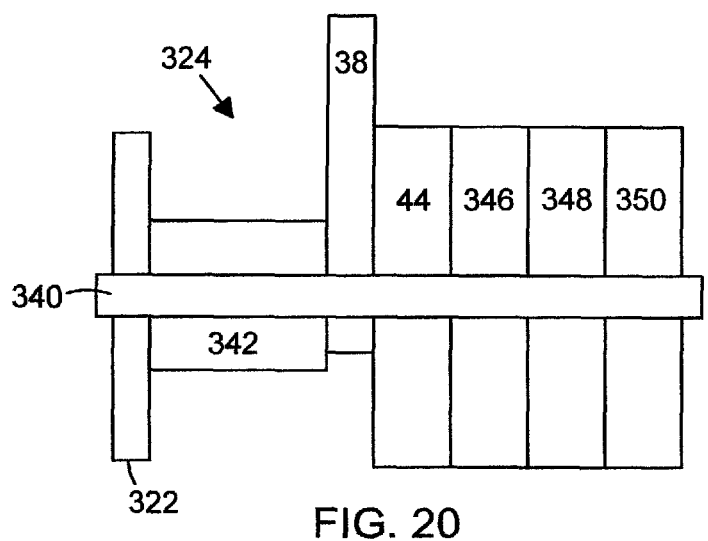
FIG. 20 is a schematic illustration of a dual mode component for various accessories on a vehicle engine.

In various other embodiments, the dual mode component 324 may be used to drive an air conditioning system coolant compressor pump, an engine oil pump and/or a transmission oil pump. As illustrated in FIG. 20, an air conditioning system coolant compressor pump propeller component 346, an engine oil pump propeller component 348 and/or a transmission oil pump propeller component 350 may be connected to and driven by the shaft 340 of the dual mode component 324 to drive the air conditioning system coolant compressor pump, an engine oil pump and a transmission oil pump, respectively. These components also may have two or more separate drive shafts.

Referring again to FIG. 19, in one embodiment, an alternator 326 which is mechanically driven by the engine 312 may supply electrical power to the dual mode component 324. In another embodiment, a battery 327 may supply electrical power to the dual mode component 324.

In one embodiment, lost energy may be recovered from the vehicle system 300 and stored in a battery 327 so the electrical power may be supplied or delivered from the battery as desired to the electrical motor 342 of the dual mode component 324. Both mechanical energy and thermal energy may be recovered from the vehicle system 300. For example, the vehicle system 300 may include a plurality of brakes 328 and a mechanical energy recovery component 330 connected to the brakes 328 to recover lost mechanical energy during braking. A generator 331 may be provided to produce electrical energy from the recovered mechanical energy. An electrical converter 334 may be connected to the generator 331 and to the battery 327 to store electrical energy in the battery 327. Similarly, a thermal energy recovery component 332 may be provided and positioned, constructed and arranged to recover thermal energy from a number of different vehicle components such as, but not limited to, the radiator 314, engine 312 or other components producing heat such as the transmission, exhaust system, turbocharger compressors and the like. In one embodiment, the thermal recovery component may be a transducer, such as a PNP device, connected to the radiator to change thermal energy to electrical energy.

An electronic control module (ECM) 336 may be provided and connected to a plurality of vehicle component systems including, but not limited to, the battery 327, electrical converter 334, generator 331, mechanical energy recovery component 330, and/or thermal energy recovery component 332, and may include hardware and software constructed and arranged to control such components including the storage and release of energy from the battery 327. If desired, a second electronic control module (SECM) 337 may be provided and connected to the battery 327 and the dual mode component 324 to control the operation of the electrical motor 342 of the dual mode component 324. The SECM 337 may include hardware and software constructed and arranged to carry out a variety of operating processes associated with the vehicle system 300 and the dual mode component 324.

ECM 336 and SECM 337 each may receive and process input from the various sensors in light of stored instructions and/or data, and transmit output signals to various actuators. Sensors for this purpose are indicated by 346, 348 and 350 in FIG. 19. ECM 336 and SECM 337 may be operated independently of one another or SECM 337 may be a slave to ECM 336 in at least some operations and process control situations. ECM 336 and SECM 337 each may include, for example, an electrical circuit, an electronic circuit or chip, and/or a computer. In an illustrative computer embodiment, ECM 336 and SECM 337 each generally may include one or more processors, memory devices that may be coupled to the processor(s), and one or more interfaces coupling the processor(s) to one or more other devices. Although not shown, the processor(s) and other powered system devices may be supplied with electricity by a power supply, for example, one or more batteries, fuel cells, or the like.

The processor(s) may execute instructions that provide at least some of the functionality for the disclosed system 300 and methods. As used herein, the term instructions may include, for example, control logic, computer software and/or firmware, programmable instructions, or other suitable instructions. The processor may include, for example, one or more microprocessors, microcontrollers, application specific integrated circuits, programmable logic devices, field programmable gate arrays, and/or any other suitable type of electronic processing device(s). Processors of this type are also preferred for the dual mode cooling pump 20 as described above with reference to FIGS. 1-18.

Also, the memory device may be configured to provide storage for data received by or loaded to the engine system, and/or for processor-executable instructions. The data and/or instructions may be stored, for example, as look-up tables, formulas, algorithms, maps, models, and/or any other suitable format. The memory may include, for example, RAM, ROM, EPROM, flash, and/or any other suitable type of storage article and/or device.

Further, the interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, CAN, MOST, LIN, FlexRay, and/or any other suitable protocol(s). The interfaces may include circuits, software, firmware, or any other device to assist or enable ECM 336 and SECM 337 each in communicating with other devices.

The methods or parts thereof may be implemented in a computer program product including instructions carried on a computer readable medium for use by one or more processors to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

The program(s) can be embodied on computer readable media, which can include one or more storage devices, articles of manufacture, or the like. Illustrative computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium also may include computer to computer connections, for example, when data is transferred or provided over a network or another communications connection (either wired, wireless, or a combination thereof). Any combination(s) of the above examples is also included within the scope of the computer-readable media. It is therefore to be understood that the method may be at least partially performed by any electronic articles and/or devices capable of executing instructions corresponding to one or more steps of the disclosed methods.

Empirical models may be developed from controlling the operation of various components including, but not limited to, the dual mode components 20 and 324 and can include lookup tables, maps, and the like that may cross reference cylinder pressure with oxygen concentration. As used herein, the term "model" may include any construct that represents something using variables, such as a look up table, map, formula, algorithm and/or the like. Models may be application specific and particular to the exact design and performance specifications of any given engine system. In one example, the engine system models in turn may be responsive to engine speed and intake manifold pressure and temperature.

As described above with references to FIGS. 1-20, one embodiment of the invention includes a method of operating a vehicle cooling system including at least one dual mode component comprising supplying electrical power and mechanical power at the same time to the at least one dual mode component to drive the same. Another embodiment includes a method of operating a system including a combustion engine, a cooling system including a radiator and a fan positioned to force air onto the radiator, plumbing connected to the radiator and the engine to deliver coolant from the radiator to the engine and back to the radiator, at least one dual mode component constructed and arranged to operate using electrical and mechanical power, at least one dual mode component connected to at least one of the fan or pump to drive the same, the mechanical power being provided directly or indirectly by the engine, comprising supplying mechanical power to the dual mode component to drive the same and during rapid engine transients, such as the rapid acceleration of the vehicle, also supplying electrical power at the same time mechanical power is being supplied to the dual mode component to assist in driving the dual mode component.

Another embodiment includes a method of operating a vehicle system comprising a dual mode component constructed and arranged to be driven by mechanical power and electrical power, comprising controlling the dual mode component so that neither mechanical power nor electrical power is supplied during rapid engine transients and thereafter supplying both electrical power and mechanical power at the same time.

Another embodiment includes a method of operating a vehicle system comprising a dual mode component constructed and arranged to be driven by mechanical power and electrical power, comprising supplying only electrical power to the dual mode during rapid engine transients and thereafter supplying both electrical power and mechanical power at the same time.

Another embodiment includes a method of operating a vehicle system comprising a dual mode component constructed and arranged to be driven by mechanical power and electrical power, comprising supplying electrical power and mechanical power at the same time to at least one dual mode component to drive the same, and thereafter, upon deceleration of the vehicle supplying only electrical power produced from an alternator or a battery to the dual mode component.

Another embodiment includes a method including operating a dual mode component for a vehicle cooling system, the vehicle system including a dual mode component including mechanical power delivery device including a clutch constructed and arranged to gradually engage and drive the dual mode component using mechanical power, the dual mode component including an electric mode for driving the dual mode component, comprising engaging the clutch to provide mechanical power to the dual mode component and supplying electrical power to the dual mode component during clutch engagement. This method reduces engagement torque of the clutch thereby increasing life of the clutch, reducing cost and preventing slippage.

A preferred method of operation is to synchronize the speeds of the electrical and mechanical modes of operation before switching from one to the other. In order to reduce engine "knock", it is preferable to switch the mode of operating the cooling pump to the mode which provides the highest cooling capacity.

Another embodiment includes a dual mode component for a vehicle cooling system by supplying electrical power to the dual mode component to drive the same during clutch engagement to drive the dual mode component using mechanical power, wherein the amount of electrical power supplied to the dual mode component during clutch engagement is such that the speed of a shaft rotating in the dual mode component is the same as the speed that the shaft would be if the dual mode component were operated by mechanical power at the engine speed and at the time the clutch is engaged, and thereafter reducing the electrical power supplied to the dual mode component in one of a step or ramp fashion until no electrical power is being supplied to the dual mode component and the dual mode component is being driven by only mechanical power.

Another embodiment includes a method wherein the system includes a battery or capacitor and wherein supplying electrical power comprises delivering electrical power from the battery or capacitor.

Another embodiment includes a method comprising recovering energy from a first vehicle component, converting the energy to electrical power, storing the electrical power in a battery, and supplying electrical power from the battery to the dual mode component constructed and arranged to drive a second vehicle component using mechanical power and electrical power.

Another embodiment includes a method wherein the first vehicle component comprises a braking system.

Another embodiment includes a method comprising recovering thermal energy from a vehicle component, converting thermal energy to electrical power, storing the electrical power in a battery, and supplying electrical power from the battery to the dual mode component constructed and arranged to drive a second vehicle component using mechanical power and electrical power. A method of operating a vehicle system comprising determining when an engine of the vehicle system is accelerating at first rate or greater than the first rate, and if so, supplying electrical power to a dual mode component while the dual mode component is also being driven by mechanical power.

Another embodiment includes a method of operating a vehicle system, the vehicle system including a battery and a dual mode component connected to the battery, measuring the remaining capacity of the battery to store additional energy, and if the remaining capacity is at or less than a first amount or capacity, then supplying electrical energy from the battery to the dual mode component to drive the dual mode component and to utilize a portion of the energy that was stored in the battery thereby freeing up capacity in the battery to store energy from mechanical and thermal energy recovery components.

Another embodiment includes a method wherein the dual mode component is being driven also by mechanical energy during the supplying electrical energy from the battery to the dual mode component to drive the dual mode component and to utilize a portion of the energy that was stored in the battery.

The vehicle system may include software, hardware, actuators and switches to operate and control component as necessary to perform the various methods described above.

Figure 11:
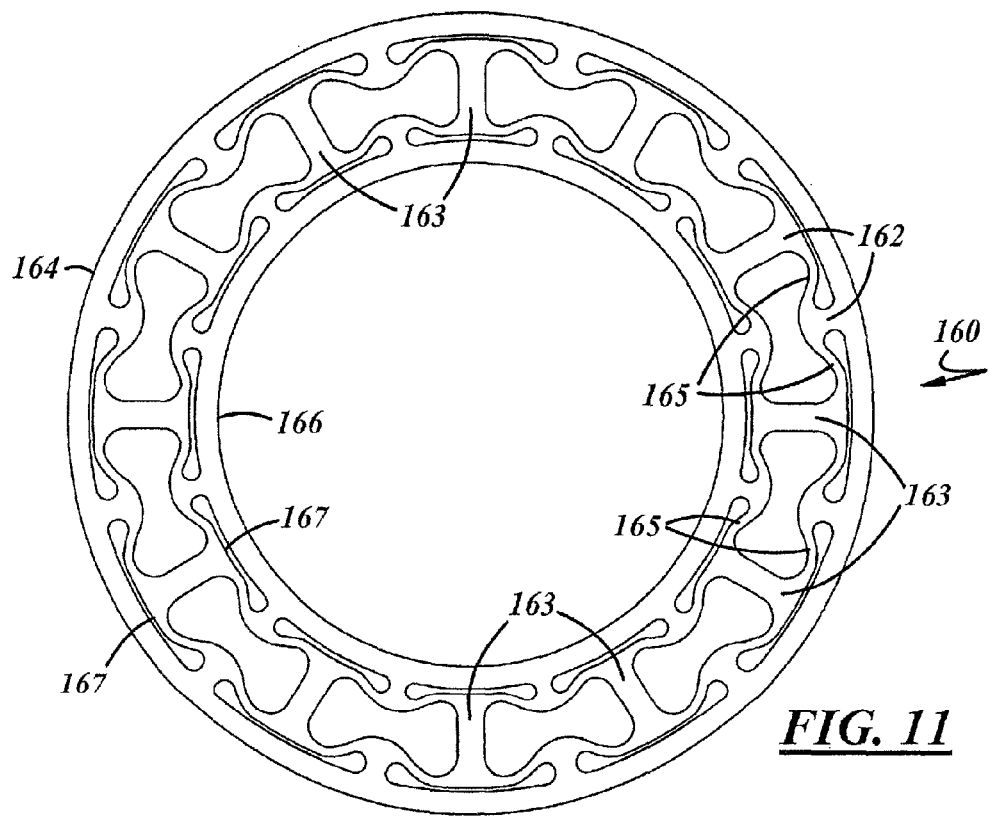
FIG. 11 illustrates an alternate embodiment of a compression spring member which can be used with the present invention.

An alternate form of a compression spring 160 is shown in FIG. 11. In this embodiment, a series of connector members 162 are positioned between an outer ring 164 and an inner ring 166. When compression spring member 160 is used in a friction clutch assembly, the outer and inner ring members 164 and 166 respectively, are constrained and fixed in place. The inner connecting members 162 are comprised of radial compression beams 163 and tangential flex arms 165. When the spring is compressed, the tangential flex arms deform allowing the radial gaps 167 to close as the spring flattens.

Figure 12:
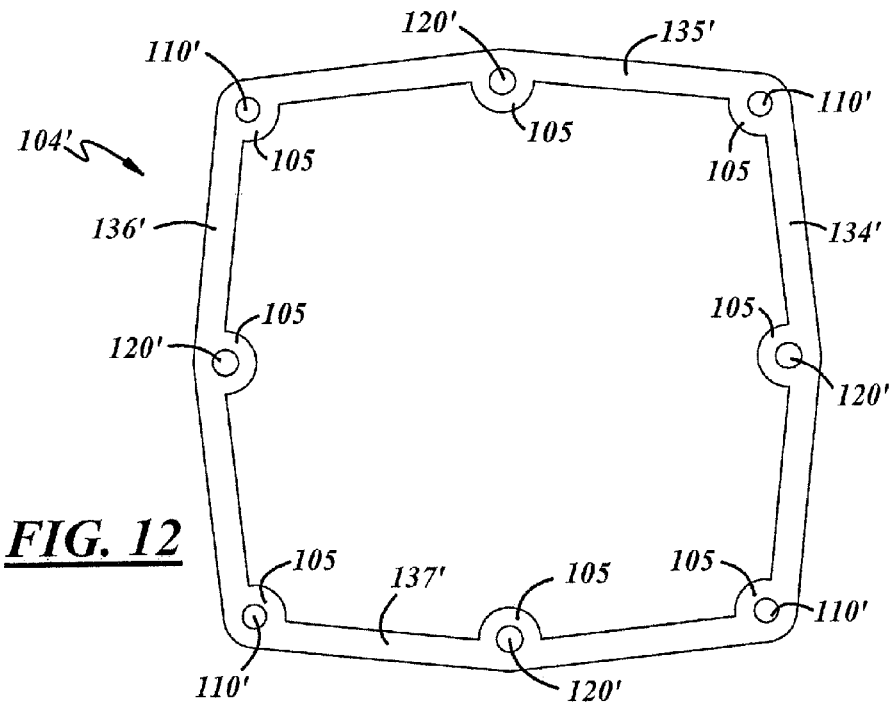
FIG. 12 depicts another alternate embodiment of a compression spring member which can be used with the present invention.

Another alternate embodiment of a compression spring member which can be used with the present invention is shown in FIG. 12. The spring member 104' is similar to spring member 104 described above, but does not have outer or inner ring members. Instead, spring member 104' has a plurality of connecting members 134', 135', 136' and 137' which extend between the areas 105 of the openings 110' and 120'. The latter openings 110' and 120' are the same as, in the same locations as, and for the same functions and purposes as, openings 110 and 120 in FIGS. 4-6.

When the compression spring member 104' is utilized in a friction clutch assembly, the connecting members 134', 135', 136' and 137' deform and buckle similar to connecting members 134-137 described above providing a similar "softening" spring member.

Another compression spring member (not shown) can be similar to the spring member 104 in FIG. 6, but only comprise an inner ring member or an outer spring member (i.e. not both), together with a plurality of connecting members.

Figures 14, 16:
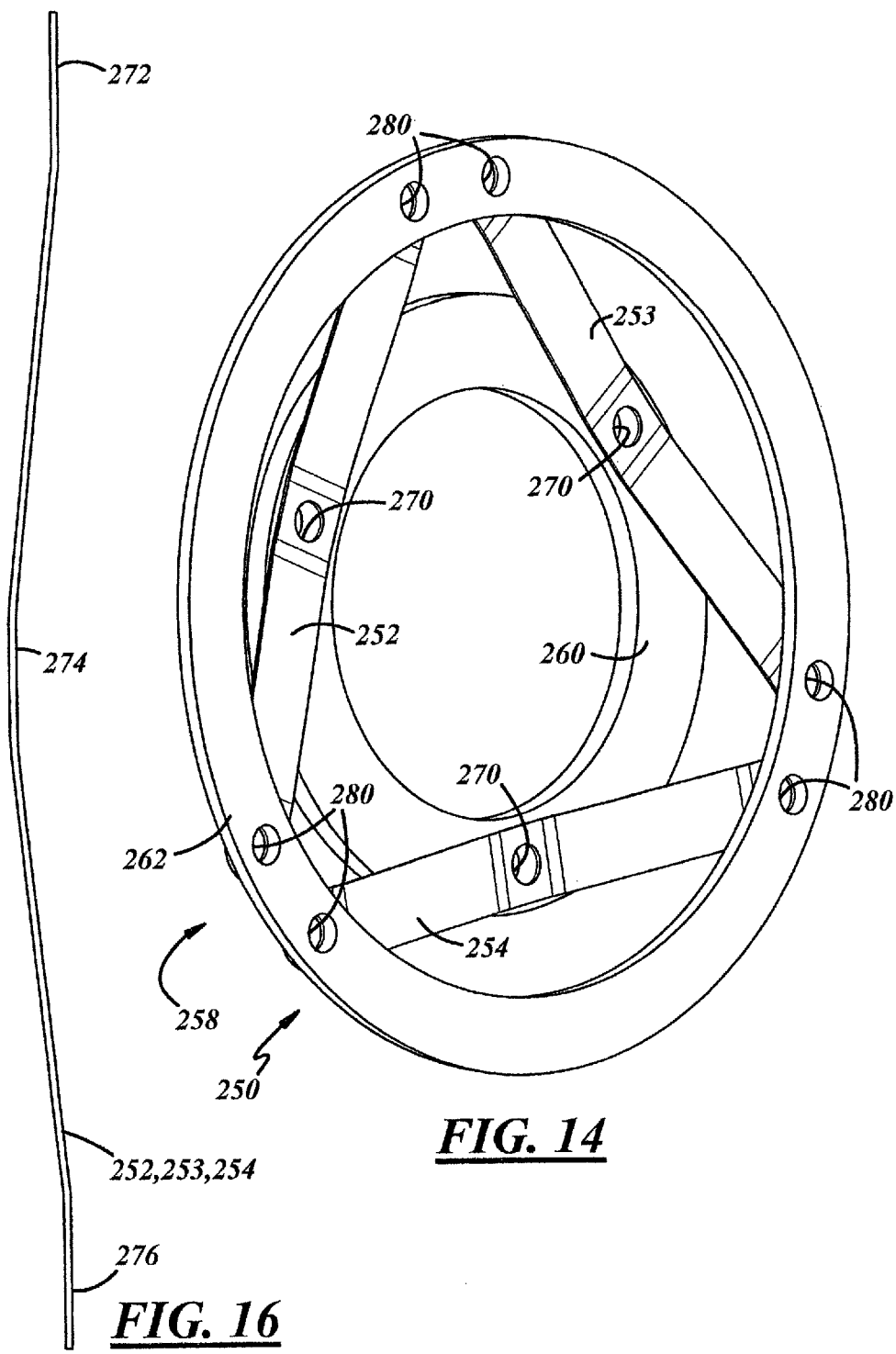

Another "softening" compression spring mechanism is shown in FIG. 14, with one of its components being shown in FIGS. 15 and 16. This mechanism 250 has a series of three "buckling beam" spring members 252, 253, 254. The three beam spring members are also referred to collectively by the reference numeral 258. As shown in FIG. 14, the beam members 252-254 are indicated as being adapted to be attached to an inner ring member 260 and an outer ring member 262. When the beam members are used in a friction clutch mechanism, such as friction clutch member 90 described above, the ring members will be replaced by a clutch carrier member and a friction lining carrier.

When the beam spring members 258 are attached to outer ring members or carrier members, fastener members (not shown) will be positioned and secured in the aligned openings 270 and 280. The fastener members can be any conventional type, but preferably are rivets. The openings can also be positioned over swagable post members in a manner as discussed above.

As shown in FIGS. 15 and 16, each of the beam spring members 252-254 preferably are thin pieces of spring steel material having the shape and structure shown. The beam spring members have a curved shape from a side view, as shown in FIG. 16, with flat areas 272, 274, 276 where the attachment holes 273, 275, 277 are located.

The compression spring mechanism 250, or at least the group 258 of buckling beam spring members, can be used in the same manner and for the same purposes as the compression spring members 104, 104' and 164 described above. The beam spring members 258 can buckle and deform under loads when the outer and inner ring members (or the clutch carrier member and friction lining carrier member) are forced toward each other in operation of the water pump.

As indicated above, the present invention provides a "fail safe" friction clutch design. If the electrical system of the vehicle were to fail, the solenoid would be de-energized allowing the spring 104 to engage the friction clutch assembly to the clutch housing. Therefore the pump would operate in mechanical mode with the impeller driven by the pulley through the clutch assembly. The clutch is thus engaged whenever circulation of coolant is needed.

Another design feature of the present invention is its modular assembly configuration. It is common for coolant pump housings to vary widely in form and configuration from application to application. In order to accommodate this wide variation of housing configurations with minimal design changes, the hybrid pump was designed so the water pump housing 24 can be easily changed while the pulley assembly 22 and the components contained within it can remain largely unchanged.

Although the invention has been described with respect to preferred embodiments, it is to be also understood that it is not to be so limited since changes and modifications can be made therein which are within the full scope of this invention as detailed by the following claims.

What is claimed is:

1. A method of operating a dual mode cooling pump for a vehicle system, said dual mode cooling pump having a housing, a shaft member bearing mounted in said housing, an impeller connected to the shaft member, an electric motor operably connected to rotate the shaft member, a friction clutch mechanism operably connected to rotate said shaft member, control logic for selectively operating the electric motor and the friction clutch mechanism to rotate the shaft member, said method comprising supplying electrical power to said electrical motor to drive the same during a first period of operation, supplying mechanical power by an engine belt system to drive said friction clutch mechanism during a second period of operation, and changing the speed of the electrical motor to be substantially the same as the speed of the engine belt system prior to actuating said friction clutch mechanism, wherein a smoother transition from said electrical power to said mechanical power is effectuated.

2. The method of operating a dual mode cooling pump as described in claim 1 wherein said friction clutch mechanism is prevented by said electric motor from engaging the engine belt system during said first period of operation.

3. The method of operating a dual mode cooling pump as described in claim 1 wherein said first period of operation and said second period of operation are mutually exclusive.

4. The method of operating a dual mode cooling pump as described in claim 1 wherein said first period of operation and said second period of operation overlap for a third period of operation.

5. The method as described in claim 1 wherein the speed of the electrical motor is increased prior to activating said friction clutch mechanism.

6. The method as described in claim 1 wherein the speed of the electrical motor is decreased prior to activating said friction clutch mechanism.

7. The method as described in claim 1 wherein the speed of the electric motor is substantially the same as the speed of the engine belt system and the method of operating the dual mode cooling pump is changed from electrical power operation to mechanical power operation.

8. The method as described in claim 7 wherein the change from electrical power operation to mechanical power operation is effectuated either at a first period of time or a second period of time and said first period of time is less than said second period of time.

9. The method as described in claim 8 wherein the change from electrical power operation to mechanical power operation is effectuated at said second period of time.

10. The method as described in claim 1 wherein engine knock is sensed and the change from electrical power operation to mechanical power operation is made to reduce engine knock.

11. The method as described in claim 10 wherein the speed of the electrical motor is increased either at a first period of time or a second period of time and said first period of time is less than said second period of time.

12. The method as described in claim 11 wherein additional power is supported by a battery in order to provide sufficient power to increase the speed of the electrical motor.

13. A method of operating a dual mode cooling pump for a vehicle system comprising supplying electrical power by an electrical motor to the dual mode cooling pump to drive the same during a first period of operation, supplying mechanical power by an engine belt system to the dual mode cooling pump to drive same during a second period of operation, actuating a friction clutch mechanism to selectively engage the engine belt system and supply mechanical power to the dual mode cooling pump, and changing the speed of the electrical motor to be substantially the same as the speed of the engine belt system prior to actuating said friction clutch mechanism, wherein a smoother transition from said electrical power to said mechanical power is effectuated; and wherein engine knock is sensed and the change from electrical power operation to mechanical power operation is made to reduce engine knock.

14. A method of operating a dual mode cooling pump for a vehicle system comprising supplying electrical power by an electrical motor to the dual mode cooling pump to drive the same during a first period of operation, supplying mechanical power by an engine belt system to the dual mode cooling pump to drive same during a second period of operation, actuating a friction clutch mechanism to selectively engage the engine belt system and supply mechanical power to the dual mode cooling pump, and changing the speed of the electrical motor to be substantially the same as the speed of the engine belt system prior to actuating said friction clutch mechanism, wherein a smoother transition from said electrical power to said mechanical power is effectuated;

wherein engine knock is sensed and the change from electrical power operation to mechanical power operation is made to reduce engine knock; and wherein the change from electrical power operation to mechanical power operation is made when said mechanical power operation has a higher cooling capacity than the electrical power operation, wherein engine knock is reduced.

\* \* \* \* \*